United States Patent
Iyer

(10) Patent No.: US 6,824,914 B2
(45) Date of Patent: Nov. 30, 2004

(54) AMINE-BASED FUEL CELL/BATTERY WITH HIGH SPECIFIC ENERGY DENSITY

(75) Inventor: Subramanian T. M. Iyer, Yorba Linda, CA (US)

(73) Assignee: Energetics, Inc., Yorba Linda, CA (US)

( * ) Notice: Subject to any disclaimer, the term of this patent is extended or adjusted under 35 U.S.C. 154(b) by 74 days.

(21) Appl. No.: 10/224,669

(22) Filed: Aug. 20, 2002

(65) Prior Publication Data

US 2003/0059655 A1 Mar. 27, 2003

Related U.S. Application Data

(63) Continuation-in-part of application No. 09/961,116, filed on Sep. 20, 2001, now Pat. No. 6,444,337.

(51) Int. Cl.[7] ........................ H01M 8/20; H01M 8/08; H01M 8/10; H01M 8/22

(52) U.S. Cl. .................. 429/46; 429/12; 429/101; 429/102; 429/103

(58) Field of Search .................. 429/46, 12, 101, 429/102, 103

(56) References Cited

U.S. PATENT DOCUMENTS

| | | | |
|---|---|---|---|
| 3,849,201 A | 11/1974 | Kordesch | 136/86 B |
| 4,001,040 A | 1/1977 | Fukuda et al. | 429/15 |
| 4,477,539 A | 10/1984 | Struthers | 429/19 |
| 6,496,685 B2 * | 12/2002 | Peterzell et al. | 455/90.1 |
| 6,667,128 B2 * | 12/2003 | Edlund | 429/46 |
| 2002/0037446 A1 | 3/2002 | Iyer | |

* cited by examiner

Primary Examiner—Hoa Van Le
(74) Attorney, Agent, or Firm—Norman E. Carte

(57) ABSTRACT

A fuel cell/battery uses amine-based liquid complexes as a direct oxidation fuel in an alkaline fuel cell/battery. Oxidant solutions are used on the cathode side to improve power density.

61 Claims, 4 Drawing Sheets

FIG. 3

| Voltage Volts | Ammonia FC/Battery Current Density amps/sq.cm | Power Density watts/sq.cm |
|---|---|---|
| 1.31 | 0 | 0 |
| 1.23 | 0.16 | 0.2032 |
| 1.15 | 0.31 | 0.3565 |
| 1.03 | 0.52 | 0.5356 |
| 0.99 | 0.61 | 0.5917 |
| 0.96 | 0.64 | 0.6144 |
| 0.91 | 0.93 | 0.8463 |
| 0.86 | 1.08 | 0.9288 |

AMINE-BASED FUEL CELL/BATTERY WITH HIGH SPECIFIC ENERGY DENSITY

PRIORITY CLAIM AND RELATED APPLICATIONS

This patent application claims the benefit of U.S. Provisional Patent Application No. 60/313,385, filed on Aug. 20, 2001 and entitled AN AMINE BASED FUEL CELL/BATTERY WITH HIGH SPECIFIC ENERGY DENSITY, the entire contents of which are hereby expressly incorporated by reference.

This patent application is a continuation-in-part (CIP) of U.S. patent application Ser. No. 09/961,116, filed on Sep. 20, 2001 now U.S. Pat. No. 6,444,337 and entitled FUEL CELL WITH LOW CATHODIC POLARIZATION AND HIGH POWER DENSITY, now published as Publication No. 20020037446-A1, the entire contents of which are hereby expressly incorporated by reference.

FIELD OF INVENTION

This invention relates generally to electrochemical fuel cells. This invention relates more particularly to a fuel cell that uses an amine-based fuel and an oxidant solution to yield high specific energy and power density.

BACKGROUND OF THE INVENTION

Fuel cells are well-known electrochemical devices that enable the conversion of the chemical energy of fuels directly into electrical energy, thereby avoiding the Carnot cycle limitations and loss of efficiency associated with combustion-related engines. Hydrogen-oxygen fuel cells can be 50%–65% efficient in practice. This is far higher than typical values for internal combustion engines.

Over the past four decades, several different types of hydrogen fuel cells have been developed for space and terrestrial applications. These various types of fuel cells are typically categorized by the electrolyte they use. Examples of such contemporary fuel cells include the alkaline fuel cell (AFC), the phosphoric acid fuel cell (PAFC), the proton exchange membrane fuel cell (PEMFC), the molten carbonate fuel cell (MCFC) and the solid oxide fuel cell (SOFC). Another type of proton exchange fuel cell currently being developed is the direct methanol fuel cell (DMFC), which uses methanol as the fuel. Although such contemporary fuel cells have proven generally useful for their intended purposes, they all suffer from inherent deficiencies which detract from their utility and desirability, as discussed below.

Alkaline fuel cells (AFC) are capable of good power density. However, AFC's have low tolerance for even very low concentrations of carbon dioxide, which gets absorbed by the electrolyte to form carbonates. This undesirable process inherently limits fuel cell operation to pure hydrogen and oxygen gases. AFCs exhibit good oxygen electrode performance, especially at high alkali concentrations. The active ionic species is the hydroxide ion ($OH^-$). The upper limit of temperature is about 260° C. AFCs can use non-noble metal catalysts. However, in automotive applications and the like, it is impractical to eliminate carbon dioxide completely from the processed hydrocarbon fuel, thus removing the AFC from transportation and similar applications. Additionally, for stationary power generation, unless a source for pure gases is available, AFCs are not deemed viable.

The phosphoric acid fuel cell (PAFC) can use ambient air and processed hydrocarbon fuel. However, PAFCs have only modest power density. Further, PAFCs cannot generate power at ambient temperature, but rather must be preheated to at least 100° C. before power can be drawn. This is due to limitations of electrolytic conductance at lower temperatures. Further, once at operating temperatures (typically around 200° C.), PAFCs must be kept below 0.8 volt per cell to prevent corrosion of cell components. This limitation makes it impractical to keep the fuel cell at open circuit (idle) for extended periods when hot. PAFCs, because of their high operating temperatures, can accept up to 1% carbon monoxide in the fuel stream. The use of an acid electrolyte limits the choice of electrocatalysts to noble metals. The active ionic species is the hydronium ion ($H_3O^+$).

Proton exchange membrane fuel cells (PEMFC) have been subject to significant research activity during recent years. The PEMFC uses an immobilized electrolyte membrane, a fully fluorinated Teflon-based polymeric material, which exhibits protonic conductance. A typical membrane produced by E.I. Dupont de Nemours has the generic name Nafion®. It has a fluoropolymer backbone, upon which sulfonic acid groups are chemically bonded. The Nafion membranes exhibit exceptionally high chemical and thermal stability up to temperatures of 125° C. Partially fluorinated membranes are also presently being investigated. PEMFCs offer modest power density, with low system weight, and volume. Because of the intrinsic nature of the materials used, low temperature operation of 80° C. is possible. The cell is also able to sustain operation at high current density. This allows fast start capability and facilitates the construction of a compact, lightweight cell.

However, the low temperature of operation makes the use of noble electrocatalysts imperative, as well as increasing the fuel cell's sensitivity to carbon monoxide poisoning. Only a few parts per million (ppm) of carbon monoxide can be tolerated by the electrocatalyst at 80° C. A specific problem associated with the PEMFC has been the need to hydrate the membrane continuously to allow protonic diffusion by the hydronium ion ($H_3O^+$), which is the active ionic species.

A variation of the PEMFC, which has attracted recent attention, is the direct methanol fuel cell (DMFC). Methanol is the only practical carbonaceous fuel with good electrochemical reactivity at the fuel cell anode. Taking advantage of this reactivity, the DMFC can be almost as simple as a hydrogen-air fuel cell, while being able to use a readily stored, inexpensive fuel. However, the DMFC has been handicapped by two major problems: poor current density and rapid diffusion of methanol through the proton membrane to the air electrode. This methanol crossover problem results in short-circuit oxidation of methanol, thereby undesirably reducing both fuel utilization and electric output. Recent research activity has concentrated on improving methanol anode activity and possible approaches to reducing the crossover problem.

The molten carbonate fuel cell (MCFC) is often referred to as a second-generation fuel cell. The MCFC operates at a significantly higher temperature, typically around 650° C. The electrolyte is usually a mixture of lithium aluminate and alkali carbonates. The active ionic species is the carbonate ion ($CO3^-$). The higher operating temperatures of MCFCs allow achievement of higher system efficiencies and greater flexibility in the use of available fuels, as well as feasibility of cogeneration. However, the high temperatures place severe demands on the corrosion stability and life of cell components in the aggressive molten carbonate environment. Electrolyte management is critical in the MCFC.

Several competing processes cause redistribution of the molten carbonate ion. The MCFC uses nickel-based anodes and nickel oxide cathodes. Structural stability of the anodes and dissolution of the NiO cathodes in the carbonate salt have been major problems. Cell performance has typically been at modest power densities.

Solid oxide fuel cells (SOFC) have recently attracted interest as viable high temperature fuel cells. The SOFC has no liquid electrolyte, with its attendant problems of corrosion and electrolyte management. The operating temperature of 650° C.–1000° C. allows internal fuel reforming, rapid kinetics with non-noble catalysts and produces heat for cogeneration. The active ionic species is the oxygen ion ($O^-$). The solid state character of the SOFC permits no restriction on the cell configuration. Both tubular and flat plate designs are being developed. Cost reduction of cell components and simplification of the manufacturing process are an important focus of ongoing development. High temperature (1000° C.) and intermediate temperature (650° C.) ceramics with the requisite conductivity are being investigated. The thermodynamic efficiency of SOFC is less than that of the MCFC and the PAFC, but the higher temperature is beneficial in reducing polarization.

A global revolution is taking place in telecommunications, information systems and the electric power industries, with important implications in the defense sector. The power source is the weak link in these industries, especially in distributed power generation. There is a need for critical, enabling power technologies to cater to these changes. Advanced batteries and other energy storage devices are needed for portable wireless electronics such as laptops, cellular phones, mission-critical instruments, low earth orbital satellites and micro-reconnaissance systems.

Several applications have been identified in the defense sector, which need new compact, high energy density power sources. Some applications include high rate primary and secondary batteries, semi-fuel cells and fuel cells for high speed underwater vehicles and torpedoes, and low rate rechargeable energy systems for long endurance missions in unmanned underwater vehicles (UUVs). Smart unmanned air vehicles and micro-vehicles for reconnaissance and stealth technology systems need compact power sources with small thermal and acoustic signatures. Distributed high quality electric power for supporting small groups of soldiers is needed, especially if such power can also facilitate cogeneration of heat and/or hot water.

Some of the alternatives for such portable power sources are planar solid oxide fuel cells (SOFC), direct methanol fuel cells (DMFC), thermophotovoltaics, alkali metal thermal to electric converters, small turbine engines, advanced rechargeable batteries, ultracapacitors and flywheels. These power technologies would also be of commercial significance in the convergence of digital, broadband, multimedia communications and computing; in mobile electronics; in dispersed fiber or wireless low earth orbit satellite based transmission networks; and in electric power for power quality sensitive industries. There exists a premium on high quality and reliability in electric power in these industries, from the milliwatt to the kilowatt level.

During the last decade, several new developments have evolved in stand-alone premium power. These developments represent radical departures from previous practice. They include novel thin film materials and membranes, used in unique multilayer device designs in solar cells, proton exchange membrane and solid oxide fuel cells, lithium-ion batteries and innovative intercalated anodes and cathodes. There has been a movement away from chemically dissimilar redox couples, limited by the periodic table, to new batteries based on single ion conductors in nickel metal hydride and lithium ion rocking chair batteries. New polymer and ceramic membranes promise to revolutionize charge transfer in solid state fuel cells and batteries, allowing use of production techniques from the electronic chip manufacturing sector.

BRIEF DESCRIPTION OF THE DRAWINGS

These, and other features, aspects and advantages of the present invention, will be more fully understood when considered with respect to the following detailed description, appended claims and accompanying drawings wherein:

FIG. 3 is a tabulation of the voltages and current densities of the chart of FIG. 2, additionally showing power density.

SUMMARY OF THE INVENTION

Figure 1:
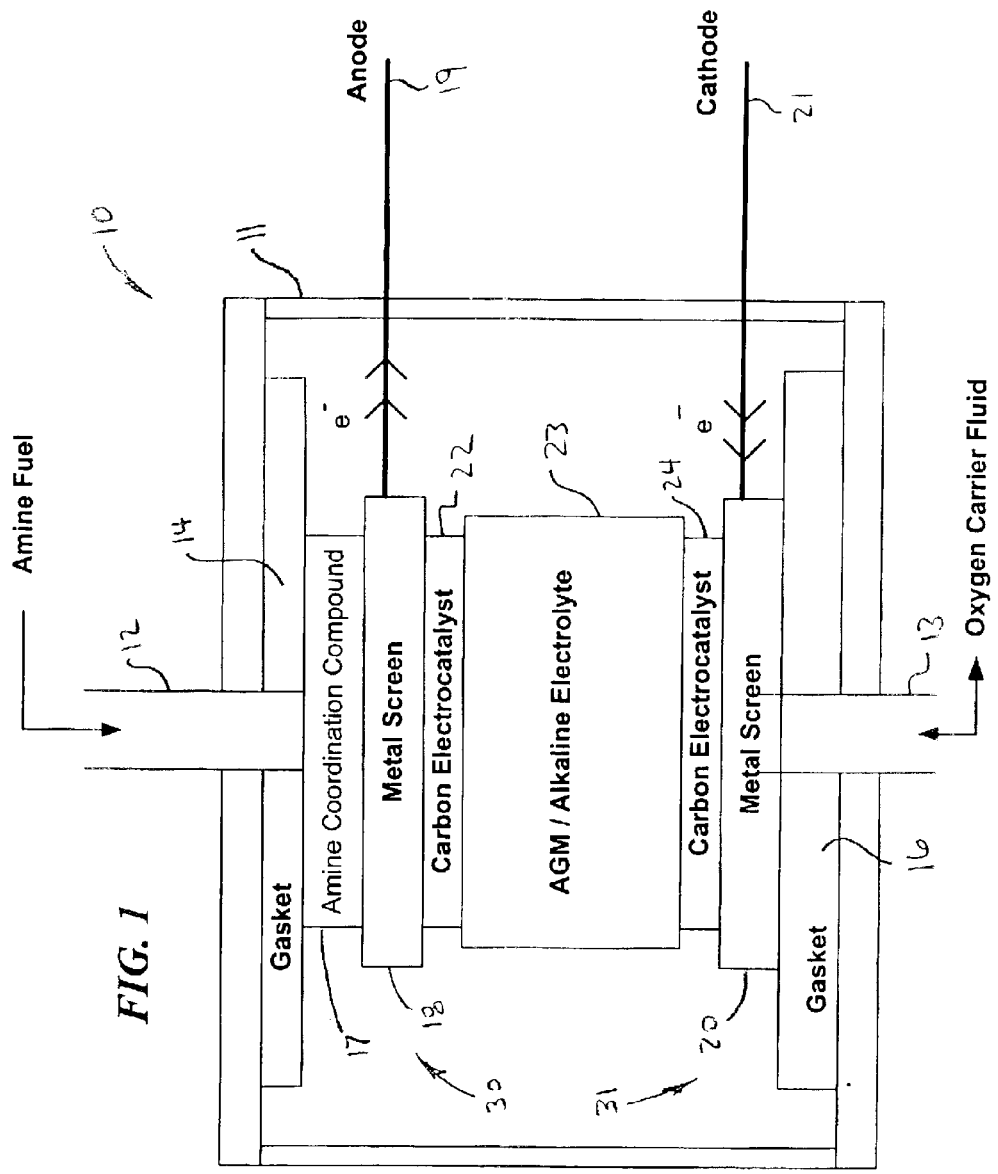
FIG. 1 is a schematic representation of an exemplary amine-based fuel cell/battery with high specific energy density according to the present invention.

The present invention specifically addresses and alleviates the above-mentioned deficiencies associated with the prior art. More particularly, the present invention comprises a matrix configured to facilitate the use of amine as a direct oxidation fuel in an alkaline fuel cell/battery. According to one aspect of the present invention, the fuel cell/battery comprises an anode electrode; a cathode electrode; a matrix having an anode facing side and a cathode facing side, the matrix being configured to provide ionic conduction and electron insulation; an amine chamber configured to facilitate provision of an amine to the anode electrode and to the matrix; and an oxidant chamber configured to facilitate provision of an oxidant solution to the cathode electrode and to the matrix.

These, as well as other advantages of the present invention, will be more apparent from the following description and drawings. It is to be understood that changes in the specific structure shown and described may be made within the scope of the claims without departing from the spirit of the invention.

DETAILED DESCRIPTION OF THE INVENTION

The detailed description set forth below in connection with the appended drawings is intended as a description of the presently preferred embodiment of the invention and is not intended to represent the only form in which the present invention may be constructed or utilized. The description sets forth the functions of the invention and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Present portable fuel cell technology has focused on methanol as the primary fuel in direct oxidation fuel cells. Other hydrocarbons being considered for ambient temperature, direct oxidation fuel cells are ethanol, dimethyl oxalate, ethylene glycol and trioxane. Metal-air fuel cells using zinc or aluminum are also being developed by industry. Alkali borohydride fuel cells and batteries are in the prototype stage. However, all of these are still in the research and development stage.

The present invention develops the science and technology for an amine-based battery. According to the present invention, ammonia is used as a direct oxidation fuel in an alkaline fuel cell. Several advantages are achieved by the fuel cell/battery system of the present invention, as discussed in detail below.

As used herein, the term battery refers to an electrochemical source of electricity which is not configured so as to facilitate the replenishment of fuel and/or oxidant by a user. As used herein, the term fuel cell is defined as an electrochemical source of electricity which is configured to facilitate replenishment of fuel and/or oxidant by a user.

As those skilled in the art will appreciate, the amine-based fuel cell/battery of the present invention can be configured either so as to facilitate replenishment of the fuel supply and/or oxidant by a user, or can be configured so as not to facilitate such replenishment, as desired. Thus, the present invention can be configured as either a fuel cell or battery. Indeed, the distinction between fuel cell and battery can become unclear, since in some instances the fuel and/or the oxidant may be replenishable, although only under certain conditions, with certain tools, or by certain personnel. Therefore, this distinction is not generally considered important for the purposes of this patent application.

The present invention presents an innovative electrochemical energy generation technology, which promises high specific energy, energy density, power density and specific power. Specifically, the invention describes the science and technology base for an amine-fueled fuel cell/battery, with low polarization and high energy and power density. Electrocatalysts, anionic membranes and electrolytes are described as applied for improved efficiency and performance, compared to the present portable fuel cells based on methanol and other hydrocarbons.

The advantages of using aqueous ammonia as a fuel include its easy availability, high solubility in water, high energy content, decreased explosion and safety hazards, its ability to be easily liquefied, and its higher electrochemical reactivity, particularly as compared to delsulfurized JP8, butane, propane and methanol. Aqueous ammonia has a relatively high density at moderate pressures. In addition, liquid ammonia is a polar solvent, like water, thus facilitating electrochemistry at lower temperatures, where water would freeze. The potential exists for military uses at sub-zero temperatures. Uses for this technology for defense applications range from battery charging, battery replacement, sensors, portable base power, soldier power and power for auxiliary power units. Commercial applications in the civilian sector range from telecommunications, cellular phones and laptop computers.

Nitrogen and its compounds have come under consideration as possible fuels for portable fuel cells. One of the main considerations for the selection of ammonia as a fuel is its low cost. The cost per kWh for ammonia is comparable to methanol, and lower than high purity hydrogen, assuming an overall efficiency of 50% in fuel cells. A second advantage of ammonia is its easy liquefaction. It has a relatively high density at moderate pressures (42.1 lb/cu ft). Heavy pressure vessels are not required, as compared to hydrogen.

Ammonia, in either aqueous or liquid form, has several advantages as a fuel, compared to hydrocarbon fuels. It is cost-competitive and has a comparable energy density. Ammonia is a colorless gas, lighter than air, with a characteristic pungent odor. Though toxic, it is easily detectable. It is extremely soluble in water, one volume of water dissolving 1300 volumes of ammonia at 0° C. and 1 atmosphere. At 20° C., 702 volumes of ammonia will dissolve in one volume of water. The high rate of dissolution is due to the formation of ammonium hydroxide:

$$NH_3 + H_2O \rightarrow NH_4^+ + OH^- \quad K = 1.8 \times 10^5$$

Ammonia is easily liquefied at room temperature by the application of pressure. It boils at -33° C. and freezes at -78° C. Liquid ammonia is a colorless, polar solvent, and behaves like water in its ionic properties. Liquid ammonia is the most-studied non-aqueous solvent, resembling the aqueous system quite closely. Both undergo self-ionization, thus:

$$2H_2O \rightarrow H_3O^+ + OH^-$$

$$2NH_3 \rightarrow NH_4^+ + NH_2^-$$

Liquid ammonia, like water, dissolves a wide variety of salts. Acid-base neutralization reactions occur in both solvents. Amphoteric behavior is observed in both liquids. Liquid ammonia is an extremely good solvent for the alkali and alkaline earth metals, the solutions having conductivity comparable to that of the pure metals, due to the occurrence of complex formation, with the release of free electrons.

Ammonia is a Lewis base, accepting a proton to form ammonium ions, since it has a tendency to donate an electron pair. Its solution in water is a weak base, where it is completely ionized. It is moderately stable, decomposing to nitrogen and hydrogen at red heat. In the presence of air, it burns with a pale yellow flame, to yield nitrogen and water. However, in the presence of a catalyst like platinum, it can be oxidized to nitric oxide and water.

Ammonia can be used in two ways as fuel for electrochemical energy conversion. It can first be converted to nitrogen and hydrogen, a reaction that is readily carried out on promoted iron catalysts, and the purified hydrogen can be used at the fuel cell anode. Alternatively, it may be used directly as the anodic reactant in a fuel cell. However, ammonia has been found to be less reactive than its traditional competitors like hydrogen, hydrazine and alkali borohydrides, which have attained high current densities (>1 amp/sq cm).

The electrochemical oxidation of ammonia has hitherto been investigated qualitatively. The Allis-Chalmers Manufacturing Company investigated ammonia fuel cells in the 1960s. The theoretical EMF expected for the ammonia-oxygen cell on thermodynamic grounds is about 1.2 volts. Experimental results with gaseous ammonia, on platinum catalysts in concentrated alkaline electrolytes, have yielded three electrons per mole of ammonia, as well as nitrogen and water as the sole reaction products.

The individual half-cell reactions in an ammonia fuel cell are as follows:

$$NH_3 + 3OH^- \rightarrow 0.5\, N_2 + 3H_2O + 3e^- \text{ (Anode) } E°_{1/2} = 0.769 \text{ v}$$

$$O_2 + 2H_2O + 4e^- \rightarrow 4OH^- \text{ (Cathode) } E°_{1/2} = 0.401 \text{ v}$$

The overall reaction is:

$$4NH_3 + 3O_2 \rightarrow 2N_2 + 6H_2O \quad E° = 1.17 \text{ volts}$$

Coulombic efficiencies of 100 percent have been obtained. However, the observed open circuit potentials have been 0.45–0.55 volt, which is slightly below half the theoretically expected value. Using a silver oxide catalyst for the oxygen electrode and the Pt catalyst for the ammonia electrode, an open-circuit potential of 0.7 volt has been observed.

The observed current-potential diagrams for ammonia-oxidation, reported in literature, indicate a substantial anodic activation polarization (Elliott and Wynveen). The room-temperature oxidation of ammonia occurs only in alkaline electrolytes (pH>9.5), and under these conditions, mainly in the double-layer region. Ammonia is inert in acid solutions; the ammonium ion is not electrochemically oxidized.

In the oxidation of ammonia, the following anodic reaction sequence has been proposed:

$$NH_3 \rightarrow NH_{3,ads}$$

$$NH_{3,ads} + OH^- \rightarrow NH_{2,ads} + H_2O + e^-$$

$$NH_{2,ads} + OH^- \rightarrow NH_{ads} + H_2O + e^-$$

$$NH_{ads} + OH^- \rightarrow N_{ads} + H_2O + e^-$$

$$2N_{ads} \rightarrow N_2$$

The recombination of nitrogen atoms seems to be the rate-limiting step, as deduced from potentiostatic current-time curves.

Due to the fairly low activity of ammonia at low temperatures, the Electrochimica Corporation has investigated ammonia-oxygen fuel cell at intermediate temperatures (180–300° C.). The electrolyte used was fused potassium hydroxide contained in a magnesium oxide matrix. Nickel electrodes containing a platinized-platinum catalyst were employed. Current potential relationships indicate a marked improvement in cell performance with increase in temperature. At 300° C., the open circuit voltage was 1.0 volt.

An ammonia-air fuel cell has been investigated at the General Electric Company. Teflon-bonded platinum black electrodes with a Niedrach-Alford structure were used. The electrolyte was 54% KOH. The platinum loading was 50 mg/sq cm, and the cell resistance was 0.03 ohm. The open circuit voltage at 140° C. was 0.8 volt, and at a current density of 500 ma/sq cm, the cell potential was 0.5 volt. The anodic reaction tended towards a limiting current density of 1 amp/sq cm.

United Technologies Corporation has studied an indirect ammonia-air fuel cell, with ammonia being cracked into hydrogen and nitrogen. A silver-palladium alloy membrane was used to separate the hydrogen from the nitrogen, and also as the anode catalyst.

Experimental data from the above studies makes it obvious that significant activation polarization effects exist in the use of gaseous ammonia in fuel cells. Aqueous solutions could be used, but the solubility of ammonia in strongly alkaline electrolytes is small, which would introduce mass transfer and concentration polarization limitations. The ammonia-air fuel cell, in order to be techno-economically feasible, needs to resolve its anodic and cathodic activation polarization. The use of ammonia solutions or liquid ammonia as a fuel would be advantageous, due to its high solubility in water and its useful phase transformation temperatures. High energy densities could be obtained if the polarization issues are resolved.

Resolution of Anodic Polarization

A very important chemical property of the ammonia molecule is its ability to form coordination compounds. It forms coordination compounds very readily with several transition elements, like copper, cobalt, silver, nickel and zinc, by donating its lone pair of electrons. These complexes are called monodentate ligands.

Some ligand complexes exchange ligands rapidly. Thus the cupric ammonium complex exchanges the ammonia molecule rapidly and is termed 'labile'. The coordinated ammonia groups can be rapidly removed from the metal, showing low activation energy for the reaction.

The chemistry of the copper-ammonia system has been studied extensively and is reasonably well understood, especially in evaluation of stress corrosion cracking (SCC), also termed season cracking, of copper and its alloys. There are several conditions, which must be met for ammoniacal SCC of copper alloys to occur—presence of water, oxygen, ammonia, an acceptable stress level and an alloy of susceptible composition and microstructure. The complexing ability of ammonia with copper is suspected to be the major cause for ammoniacal SCC of copper and its alloys.

One reaction pathway suspected in the SCC of copper is that the copper in the alloy reacts first with ammonia to form a complex ion, and the complex ion reacts with hydroxyl ions to form cuprous oxide. The process is autocatalytic. Plastic flow and fracture occurs subsequently at slip fields and dislocations, leading to failure. The suspected chemical reactions are as follows:

Dissolution Reaction-$Cu + nNH_3 + 1/2O_2 + H_2O \rightarrow Cu(NH_3)_n^{++} + 2OH^-$ Cathodic Reaction-$Cu(NH_3)_4^{++} + e^- \rightarrow Cu(NH_3)_2^+ + 2NH_3$ (ads)*

Precipitation Reaction-$2Cu(NH_3)_2^+ + 2OH^- \rightarrow Cu_2O + 2NH_3$ (ads)* + $H_2O$ On a copper surface, the primary reduction reaction in aerated copper-free aqueous ammonia is oxygen reduction and the primary oxidation reaction is oxidation of copper to form cuprous complex ions:

$$Cu + 2NH_3 \rightarrow Cu(NH_3)_2^+ + e^-$$

These ions react with oxygen to form cupric complex ions:

$$2Cu(NH_3)_2^+ + 1/2O_2 + H_2O + 4NH_3 \rightarrow 2Cu(NH_3)_4^{++} + 2OH^-$$

Thus, in oxygenated ammoniacal solutions, copper in solution exists primarily as the cupric complex ion. The exchange current density for cupric ion reduction is much greater than for oxygen reduction, and thus cupric ion reduction is the dominant reaction in copper containing solutions. The overall process is autocatalytic, since the copper dissolution reaction generates more cuprous ions, which subsequently form cupric ions, which in turn accelerates the copper dissolution reaction. The primary role of the cupric complex appears to be as an oxidant in solution that provides a cathodic reaction, as well as to anodically polarize the metal.

$$Cu(NH_3)_4^{++} + e^- \rightarrow Cu(NH_3)_2^+ + 2NH_3 \text{ (ads)*}$$

The concentration of dissolved copper has been found to have an accelerated effect on reaction rates. The alkalinity, denoted by the solution pH, also has a similar effect on reaction rates, with the highest rates noticed in the pH range of 10–14. Increasing anodic polarization was also found to have a similar effect, as did the dissolution rate of copper. An additional postulated side-reaction is the oxidation of $NH_3$ to $NO_2^-$ and $NO_3^-$, which accelerates SCC embrittlement mechanisms by localized release of hydrogen at crack tips.

Potential-pH diagrams of copper in ammoniacal solutions (Pourbaix diagrams) show the thermodynamic stability areas of oxidation of $NH_3$ to $NO_2^-$ and its effect on SCC of copper alloys.

Studies on the transgranular SCC (T-SCC) of copper alloys have investigated the mechanism of embrittlement. The kinetics of crack-advance distances indicates that diffusivities of ~$10^{-9}$ cm$^2$/s of the embrittling species would be required for crack propagation. Diffusivities of this magnitude suggest hydrogen as the embrittling species, since extrapolation of high-temperature bulk-diffusion data for hydrogen indicate values of $10^{-9}$–$10^{-8}$ cm$^2$/s in copper at 25° C. Alternate SCC mechanism like film-rupture, dezincification and other anodic dissolution models seem less likely to be the primary embrittling mechanism, based on these observations. On the other hand, intergranular SCC (I-SCC) seems to take place by continuous cracking, caused by anodic dissolution. Whether the crack path is intergranular or transgranular is a complex function of alloy composition and electrochemical factors. In alpha-beta alloys, the SCC path is intergranular between alpha grains and transgranular across beta grains; in all-beta alloys, SCC is predominantly transgranular.

Acoustic emission monitored during load-pulsing tests detected discrete emissions of large amplitude. Significantly, these were found to be associated with the sudden appearance of fine cracks. Scanning electron microscopy of the copper samples exhibited predominantly transgranular cracking.

It has been shown that the critical potential, below which transgranular SCC does not occur, corresponds closely to the reversible potential for the cathodic reaction:

$$Cu^+ + e^- \rightarrow Cu$$

It has been suggested that there exists an apparent association between copper dissolution at the extremely fine crack tip during SCC and hydrogen produced by the anodic reaction:

$$Cu + 2NH_4^+ \rightarrow Cu(NH_3)_2^+ + 2H^+ + e^-$$

Investigations on the specific orientation of transgranular SCC does not occur, alloys show that the cleavage planes are also the habit planes for hydride formation. The observed fracture planes have not been accounted by alternative models for SCC. Moreover, in those alloys that undergo conventional cleavage, the normal cleavage plane is not the same orientation as the observed stress corrosion fracture surfaces. The above findings seem to confirm the role of hydrogen in the transgranular SCC of copper alloys. The oxidation of ammoniacal nitrogen to nitrite ions, and subsequently to nitrate ions, in the presence of excess oxygen, suggests the availability of adsorbed hydrogen for embrittlement mechanisms.

There is an additional difference in the fracture morphology of transgranular versus intergranular SCC. The absence of crack-front markings in I-SCC in copper alloys seems consistent with the fact that I-SCC occurs by preferential anodic dissolution, i.e. by a substantially different mechanism than T-SCC. The absence of discrete acoustic emissions during load-pulsing tests is also fully consistent with a dissolution model.

It can be deduced that an environment, which provides a species leading to complex ion formation, is instrumental in SCC of copper alloys. The regions of complex ion formation and oxide film stability are predictable from potential-pH diagrams, if sufficient data are available for the construction of such diagrams. The ammonium ion is the specific corrodent in T-SCC of copper alloys, while citrates, tartrates, nitrites, sulfur dioxide, carbonates, nitrogen oxides and phosphates, amongst others, have also led to SCC, predominantly I-SCC, of copper alloys. Most of the latter SCC mechanisms were observed at the intermediate pH ranges of 6–8. Pyridene and ethylenediamine do not produce SCC of brass, but do cause intergranular attack.

Effects of solution pH in concentrated ammoniacal copper sulfate solutions showed a majority of transgranular cracks existed in the pH ranges of 3.9–5.7 and 7.8–11.2, while cracking was primarily intergranular in the range of 6.3–7.7, with substantial tarnishing. These studies seem to confirm the probable effect of hydrogen as an embrittling species in the T-SCC of copper alloys.

Similarly, studies on the effect of potential on SCC of copper alloys in both ammoniacal and non-ammoniacal environments indicate that cracking susceptibility increases with increasing anodic polarization. No cracking was observed at the free corrosion potential. The specimens were tarnish free and the failure mode of all specimens was transgranular. Based on this work, it seems the role of the cupric ion in solution, which promotes SCC, is to anodically polarize the specimen. Examination of the relevant areas in potential-pH diagrams at these potentials and pHs reveal the stability of nitrogen, the nitrite and nitrate ions, in preference to the ammoniacal complexes. Effect of temperatures, in general, appears to follow Arrhenius-type behavior for T-SCC and I-SCC of copper alloys.

Using copper-ammoniacal complexes to decrease anodic polarization can conceivably modify the essential rate-limiting step during the oxidation of ammonia. Potentiostatic studies have found that the recombination of nitrogen atoms is the rate-limiting step in ammonia oxidation. Modification of this step by copper complexation of ammonia to yield nitrogen, or the nitrite or nitrate ions, can potentially minimize anodic polarization. Such a reaction has been shown to occur in the T-SCC of copper alloys.

The standard reduction potentials for the oxides of nitrogen in a basic solution are shown in the following Latimer diagram:

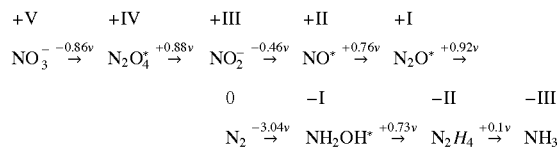

*Disproportionates

A simplified Latimer diagram for nitrogen in basic media is as follows:

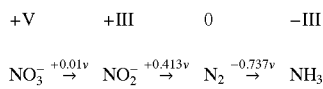

It can be seen that ammonia can be oxidized to yield either nitrogen gas or its ions. The oxidation of ammonia to the nitrite ion yields a standard potential of 0.054 volt. On the other hand, the oxidation of ammonia to nitrogen yields a standard potential of 0.737 volt. The standard thermodynamic potentials strongly favor the formation of nitrogen during ammonia oxidation.

The main postulated pathway in this proposal would be the metal-to-ligand interaction of the nitrogen donor atoms, which would help in the recombination of nitrogen atoms during the preferential oxidation of the hydrogen component atoms of the ammonia molecule. The cuprous-cupric exchange interaction of the ammoniacal complex with copper is an established mechanism. The latter reaction releases adsorbed ammonia for preferential oxidation, promising improved reaction rates and lower polarization. The oxidation reactions lead to both copper oxide formation, as well as the formation of nitrogen, or the nitrite and nitrate ions, depending on the amount of oxygen available.

Such an electrochemical pathway would be an ideal mechanism for the preferential oxidation of the hydrogen in the ammonia molecule, catalyzed by the presence of copper ions in solution. This would serve as a low activation-energy route for an aqueous/liquid ammonia-fueled battery/fuel cell. Superimposed Pourbaix diagrams reveal the thermodynamic viability of such a mechanism, as compared to the oxidation of gaseous ammonia to yield water and nitrogen, attempted in earlier fuel cells using gaseous ammonia. In copper-ammonia complexes, the donor atoms are the nitrogen atoms, sharing a pair of electrons with the copper atom. This is of critical importance in the efficient oxidation of ammonia. The advantage of copper-ammonia coordination compounds in lowering the activation energy for recombination of the nitrogen atoms during ammonia oxidation can be of significance in ammonia fuel cells/batteries.

An alternate route, which can be of importance for high power density batteries, would be the hydroxylamine battery. The standard reversible potential for oxidation of hydroxylamine to nitrogen is 3.04 volts. However, hydroxylamine is a very unstable compound and decomposes to ammonia, nitrogen or nitrous oxide very easily. It explodes on heat or shock, though it can be handled in aqueous solutions or as one of its salts. It disproportionates slowly in acidic solutions, and very rapidly in alkaline solutions. Hydroxylamine has donor properties like ammonia and hydrazine; the nitrogen atom can form coordination compounds with transition metals. Such a property can be of use in stabilizing the hydroxylamine molecule.

Resolution of Cathodic Polarization

The electrochemical behavior of oxygen in hydrogen-oxygen fuel cells is essentially more complicated than that of hydrogen. This is due to the great stability of the double bond in the oxygen molecule. Over the entire pH range, the rest potential of the oxygen electrode is very slowly established. Values of more than 100 mV less than the theoretical oxygen potential are commonly measured. Various intermediate radicals are formed after the oxygen bond is broken, further complicating the course of reaction. The kinetics of oxygen reduction on electrocatalysts is controlled by the rate of charge transfer involving adsorption of molecular oxygen, and is inhibited by these intermediates. Low exchange current density for oxygen reduction is observed, resulting in high activation polarization and non-ideal behavior. Various electrocatalysts have been investigated, but none have been able to bring the open circuit voltage close to ideality.

One innovative approach promises increased efficiency at the oxygen electrode by the use of chemisorbed oxygen solutions, reducing cathodic polarization. Experiments were performed with hydrogen fuel cells to investigate possible methods of improving the efficiency of the oxygen electrode. Several oxygen carrier fluids, both organic and inorganic in nature, were investigated. In addition, oxidizing agents were also considered. The basic requirements of such an oxygen carrier would necessarily be: stability in the fuel cell environment, rapid and reversible absorption of oxygen, and high mass transfer coefficients. Rapid reversibility would promote low activation energy for charge transfer in the fuel cell, resulting in near-ideal open circuit voltages. High oxygen mass transfers to the cathode would reduce concentration polarization effects. An additional benefit would be realized if the oxygen carrier fluid was electrolytic in nature. This would simplify the fuel cell system complexity. A principle advantage of using a liquid on the cathode side would be simplified bipolar designs. The oxygen carrier fluid would have to be able to absorb oxygen from air with minimal expenditure of energy, preferably at near-ambient temperatures and pressures.

Several organic molecules have the ability to absorb oxygen selectively. One common example is hemoglobin, which transports both oxygen and carbon dioxide in red blood cells, making life possible. Amongst synthetic organic molecules, silicone and fluorocarbon molecules are known for their ability to carry oxygen. Thus in the 1960's, Clark and Gollan demonstrated that mice immersed in oxygenated silicone oil or liquid fluorocarbon could breathe in the fluid. It was also reported that artificial cells formed from a hybrid of silicone rubber and hemolysate were efficient in carrying and releasing oxygen. Finely emulsified fluorocarbon was found to be very efficient in oxygen absorption and release. Perfluorodecalin emulsions have been suggested for blood substitutes.

Recently, two new types of perfluorochemicals have been developed by the bio-chemical industry for oxygen transport. They are based on perfluoroctyl bromide ($C_8F_{17}Br$) and perfluorodichoroctane ($C_8F_{16}C_{12}$) molecules. The biggest advantage of perfluorochemicals is the fact that they are synthetic organics that can be chemically produced in large amounts. Oxygen absorbing perfluorocarbon molecules can have a significant advantage in fuel cell performance, due to their high stability in a wide range of pH, temperatures and pressures. Oxygen carrying capacity is essentially dependent on the concentration of the perfluorochemicals. These molecules have been found to selectively transport both oxygen and carbon dioxide.

Quinone compounds, especially sulfoanthraquinones, anthraquinone or benzoquinone, have also been found to be electron acceptors. Quinones are used in organic synthesis as mildly oxidizing agents. In its excited state, the quinone compound is capable of stripping electrons from the fuel donor, and in turn is oxidized to its ground state by releasing the extra electrons to the electrode. In cases where the quinone compound in its ground state has a higher affinity for electrons than certain fuels, like polyhdroxyclic compounds such as reducing sugars, the quinone compound can strip electrons from these fuels. Once reduced, releasing electrons to the electrode reoxidizes the quinone compound. U.S. Pat. No. 4,578,323 discusses fuel cells using these findings, producing electricity by using quinones to oxidize hydroxyclic compounds.

Several inorganic compounds have also been found capable of oxidation. Though, normally, an oxygen (air) electrode is used for the positive electrode of a fuel cell, special cases exist, like in submarines and underwater vehicles, where use of an oxidizing agent in the liquid state is advantageous. Most of them are oxidizing agents, like hydrogen peroxide, nitric acid, perchloric acid, bromine and chlorine. Cost of replenishment and chemical activity of the oxidant is a major consideration.

Some oxidants investigated include the permanganate and dichromate salts. These are milder oxidants, compared to the above-mentioned compounds. Potassium permanganate and potassium dichromate are common laboratory chemicals.

The advantages of the present invention include high current density, efficiency and power density, using alkaline fuel cell chemistries; low oxygen electrode polarization; lower cost due to the use of commercially available metals for flow fields and bipolar plates; use of non-noble catalysts; and low temperature (60° F.) and medium temperature (200° F.) operation.

Exemplary Fuel Cell

An experimental fuel cell was constructed. Hydrogen was used as a fuel to eliminate any effects of anodic polarization in the cell. Stainless screens were used as the current collectors and flow fields. Electrocatalysts used were commercially available platinized carbon cloth, wet-proofed by means of a hydrophobic fluorocarbon/carbon layer. Potassium manganate solution initially was used as the oxygen carrier fluid. Both an anion exchange resin and concentrated potassium hydroxide solutions, immobilized in an absorbent glass mat, were used as electrolytes. The relevant anodic and cathodic reactions are as follows:

Anode: $H_2 + 2OH^- \rightarrow 2H_2O + 2e$  $E°1/2° = 0.830$ V

Cathode: $MnO_4^- + 2H_2O + 2e \rightarrow MnO_2 \downarrow + 4OH^-$  $E_{1/2}° = 0.603$ V The total electrochemical reaction in the fuel cell is as follows:

$H_2 + MnO_4^- \rightarrow MnO_2 \downarrow + 2OH^-$  $E = 1.433$ V

A positive value for the standard reversible potential shows a spontaneous reaction in the forward direction.

The equilibrium constant K for the reaction can be calculated as follows:

$K = [MnO_2][OH^-]^2 / [MnO_4^-]pH_2$ i.e. $K = [OH^-]^2 / [MnO_4^-]pH_2$

The manganese dioxide precipitates out in the reaction, and hence is not considered in the computation of the equilibrium constant. Using the Nernst equation, the equilibrium constant computes to $3.12 \times 10^{48}$. A large number for K shows a spontaneous reaction in the forward direction.

Shown as a chemical reaction, the fuel cell reaction translates to the following:

$H_2 + K_2MnO_4 \rightarrow MnO_2 \downarrow + 2KOH$

The cathodic reaction products were treated with oxygen, or air free of $CO_2$, outside the fuel cell chamber to replenish the potassium manganate solution. This is similar to the industrial process for production of alkali manganates. Higher temperatures (≈80–95° C.) favor the replenishment reaction. The reaction is as follows:

$2MnO_2 + 4KOH + O_2 \rightarrow 2K_2MnO_4 + 2H_2O$

The overall chemical reaction of the complete fuel cell system, with oxygen replenishment, is as follows:

$2H_2 + O_2 \rightarrow 2H_2O$

The essential advantage of the proposed reaction mechanism is the fact that in the electrochemical system, a higher standard potential is achievable, as compared to conventional fuel cells. The standard potential for conventional fuel cells using hydrogen and oxygen to form water is 1.23 V. The standard potential for the manganate-hydrogen fuel cell is 1.433 V. Water is formed in the anolyte chamber of the electrochemical cell.

The experimental fuel cell was fabricated and tested as described in the paragraphs above. Open circuit voltage measurements on the experimental fuel cell approximated from 1.39–1.42 V, thus exhibiting near-ideality to the calculated thermodynamic standard equilibrium potential of 1.433 V. The deviation from ideality is postulated to be due to internal cell resistance loss, as well as very small activation polarization effects. In comparison, in conventional fuel cells, open circuit voltages approximate 0.9 V or lower, at standard conditions, showing substantial deviation from the standard equilibrium voltage of 1.23 V. The experimental fuel cell thus exhibits an improvement in efficiency of 40–45% over conventional fuel cells, by reducing the activation polarization losses inherent in conventional fuel cells.

It is well documented in technical literature that the hydrogen electrode functions with near ideality in both acid and alkaline electrolytes. The attainment of near ideality in open circuit voltage measurements in the experimental fuel cell, as compared to the calculated reversible potentials, shows that the cathodic reaction functions with minimal activation polarization. This is a significant improvement over present generation fuel cells, where the activation polarization of the oxygen electrode causes a 20–25% loss in efficiency.

The anodic reaction of the experimental fuel cell is similar to the anodic reaction in an alkaline fuel cell, with attendant desirable attributes of excellent performance of the electrodes over a wide range of electrocatalysts. The cathodic reaction of the experimental fuel cell is an equally facile reaction, allowing great flexibility with a wide range of electrocatalysts. The electrode reaction kinetics for oxygen reduction in alkaline electrolytes is much better than in acid electrolytes, carbonate electrolytes or solid oxides. The experimental fuel cell is a substantial improvement over alkaline electrolytes due to the use of the oxygen carrier fluid, which utilizes the manganate ion to allow hydroxide ion replenishment, with minimal activation energy barriers.

Concentration polarization effects in the experimental fuel cell were lower, when compared to conventional fuel cells. The recirculating loop of the oxygen carrier fluid allows good mass transfer coefficients. One of the reaction products is manganese dioxide, which precipitates out. Thus, it does not enter into considerations of the reaction equilibrium constant, allowing the forward cathodic reaction to proceed with greater kinetics. This, coupled with recirculating the fluid, allows lower concentration polarization effects. Electrical measurements exhibited a power density of 1 watt per square centimeter of electrode area. Hydrogen pressures were maintained at 15 psi (1 atm). Higher pressures will result in an attendant increase in power density. All fuel cell testing was conducted at room temperature.

Open circuit voltages were measured at 1.39–1.42 volts. Oxygen replenishment tests of the depleted solution at atmospheric pressure at 85–95° C. were also found to be rapid and facile.

The Latimer diagram for the various oxidation states of manganese, in basic media, is as follows:

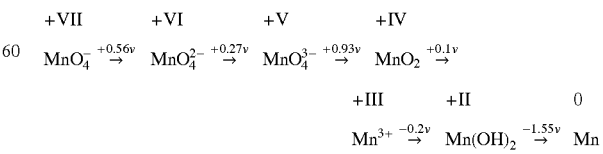

From the above diagram, an alternate reaction mechanism on the cathode side, if oxygen replenishment were not a system requirement, would be to use potassium or sodium permanganate as the oxidizing species, per the reaction:

$$MnO_4^- + 2H_2O + 3e^- \rightarrow MnO_2\downarrow + 4OH^-\ E° = 0.587\ \text{volt}$$

Testing of such a reaction mechanism also yielded similar polarization curves in a hydrogen fuel cell, using permanganate solutions at the cathode. In cases where reactant replenishment can be done as sealed cartridges, or in battery power sources, the copper-ammonia-permanganate system promises high specific energy and power density.

The overall reaction mechanism in the ammonia fuel cell, using the manganate salt, is as follows:

$$\text{Anode: } 2NH_3^{(ads)*} + 6OH^- \rightarrow N_2 + 6H_2O + 6e^-\ E°_{1/2} = 0.737\ \text{volt}$$

$$\text{Cathode: } MnO_4^{2-} + 2H_2O + 2e^- \rightarrow MnO_2\downarrow + 4OH^-\ E°_{1/2} = 0.603\ \text{volt}$$

The complete cell reaction between the ammonia fuel, present as a copper-ammonia complex, and the manganate oxidizer is:

$$2NH_3^{(ads)*} + 3MnO_4^{2-} \rightarrow N_2 + 3MnO_2\downarrow + 6OH^-\ E° = 1.34\ \text{volt}$$

The consumption of the ammonia and the manganate leads to an increase in pH, due to the production of potassium hydroxide.

The overall reaction mechanism, using the permanganate salt, is as follows:

$$\text{Anode: } 2NH_3^{(ads)*} + 6OH^- \rightarrow N_2 + 6H_2O + 6e^-\ E° = 0.737\ \text{volt}$$

$$\text{Cathode: } MnO_4^- + 2H_2O + 3e^- \rightarrow MnO_2\downarrow + 4OH^-\ E° = 0.587\ \text{volt}$$

The complete cell reaction between the complexed ammonia and the permanganate oxidizer can be written as follows:

$$2NH_3^{(ads)*} + 2MnO_4^- \rightarrow N_2 + 2MnO_2\downarrow + 2OH^- + 2H_2O\ E° = 1.323\ \text{volt}$$

An alternate pathway would be as follows at the cathode:

$$MnO_4^- + e^- \rightarrow MnO_4^{--}\ E° = 0.56\ \text{volts}$$

This would avoid any problems associated with precipitation of manganese dioxide.

These reactions lead to an increase in pH on the cathodic side due to generation of the hydroxyl ion. Depending on system requirements, either of the two oxidizers could contribute to high efficiency and high power density. Preliminary testing, although in a very rudimentary cell, of a copper-ammonia-permanganate system, using platinized carbon cloth and a commercial anion exchange resin, yielded an open circuit voltage of 1.31 volts and a current density of 1000 ma/sq. cm under load at room temperature. This proof-of-concept demonstration potentially validates the efficacy of the proposed system as a source of power generation.

The preferred electrolyte would be a solid polymer anion exchange membrane. The strongly basic quaternary ammonium hydroxide type anion exchange membrane has shown some interesting properties, making it worthy of consideration as an alkaline fuel cell electrolyte. Low water permeabilities, thermal and chemical stabilities in alkaline environments are some of the useful properties, along with good burst strengths and low electrical resistance.

The use of an anionic solid polymer electrolyte would contribute significant weight savings for the total system, as compared to anion exchange resin or concentrated KOH, immobilized in an asbestos or glass matrix. Another possible advantage in using anion exchange resins would be the possibility of using non-noble metals as catalysts, possibly nickel or nickel-copper for the anode and silver for the cathode. The principal properties of interest would be the degree of ionization and ionic conductivities for the hydroxyl ion in the solid polymer membrane. Other oxidizers could also be used, like oxyhalides, nitrates, dichromates, etc. These would function in an acidic or neutral environment, with changes in the polymer electrolyte membrane.

The advantages of such a system for power generation would be the high specific energy density of aqueous ammonia solutions, with the ammonia complexed with suitable metals. A specific energy of 3000 Wh/kg has been calculated. Given the high solubility of ammonia in water (almost 700 volumes per volume of water under standard conditions, yielding a large amount of fuel available per unit volume of water), the cost-competitiveness of the fuel, and its high reactivity for complex formation with transition metals is obvious to those practitioners skilled in the art. The complex formation ability of ammonia would be of significant advantage in reducing activation polarization during the oxidation of its hydrogen component, by allowing the facile recombination of nitrogen atoms. There also exists the possibility of using liquid ammonia in sub-zero environments, on account of its excellent ionic conductivity and self-ionization, which would be useful, when used in conjunction with anionic quaternary ammonium solid polymer electrolytes, or with anion exchange resins.

Alternative Hydroxylamine Battery

Another embodiment of the invention is the hydroxylamine-permanganate battery. The half-cell reactions are as follows:

$$\text{Anode: } 2NH_2OH^{(ads)} + 2OH^- \rightarrow N_2 + 4H_2O + 2e^-\ E°_{1/2} = 3.04\ \text{volts}$$

$$\text{Cathode: } MnO_4^- + 2H_2O + 3e^- \rightarrow MnO_2\downarrow + 4OH^-\ E°_{1/2} = 0.587\ \text{volt}$$

The complete cell reaction is as follows:

$$6NH_2OH^{(ads)} + 2MnO_4^- \rightarrow 3N_2 + 2MnO_2\downarrow + 2OH^- + 8H_2O\ E° = 3.627\ \text{volts}$$

The nature of hydroxylamine and its propensity to disproportionate, if properly controlled, can lead to high voltages and current densities, since very low activation energies would be required for its oxidation. Its ability to form coordination compounds can be a possible mechanism for controlling its inherent instability. Thus, hydroxylamine promises greater potential than did the hydrazine fuel cell, the latter fuel having been investigated extensively in the past.

One embodiment of this invention includes hydroxylamine batteries for high power density applications. Hydroxylamine has limited solubility in water, as compared to ammonia, hydrazine or methanol. Also, its oxidation state is lower than that of ammonia, reducing its specific energy. Hence specific applications targeted would be those with lower specific energy requirements, having an energy density goal of 1000 Wh/kg. However, the complexing properties of hydroxylamine and the solubility of these compounds allow both stabilization of the amine and improved specific energies.

Thus, the present invention uses amine-based fuels for power generation in an electrochemical cell, with the fuel being suitably complexed in a soluble coordination compound. The present invention reduces the oxygen electrode polarization in fuel cells, with attendant improvements in ideality, open circuit voltage and power density. The present invention provides an oxidant solution to the fuel cell to minimize activation energy losses at the cathode. The present invention minimizes concentration polarization losses in the fuel cell at higher current density during operations. Further, the present invention provides a fuel cell having high current density and power density, low oxygen electrode polarization, no water management problem, lower cost due to the use of an absorbent glass mat, glass wool or similar structural matrix between the anode and cathode, lower cost due to the use of commercially available metals for flow fields and bipolar plates, use of non-noble catalysts, and low temperature (−60° F.) and ambient temperature (80° F.) operation.

The Direct Methanol Fuel Cell (DMFC) has generated sizeable research attention in recent years. Methanol is one of the most electroactive organic fuels at the present time in the low temperature range—mainly because it has a low carbon content, it possesses a readily oxidizable group (hydroxyl) and it has high solubility in aqueous electrolytes. Only formaldehyde and oxalic acid are more active. The thermodynamic reversible potential of the cell under standard conditions is 1.20 volts. In laboratory experiments, open circuit voltages of around 0.9 volts have been observed. A contributing factor is the characteristic inefficiency of the oxygen electrode. Transport of the methanol to the cathode reduces the cathode performance further.

The advantages of DMFC are several—methanol is a liquid, quite soluble in water, thus reducing concentration polarization problems associated with gaseous fuels; methanol is cheap and easy to handle and store; and it has good electroactivity for an organic fuel. The best performance reported has used a 1:1 ratio of methanol to water. Normally, much lower concentrations of methanol in water are used.

The main disadvantage of methanol has been its 'crossover' to the cathode, reducing performance and efficiency. Methanol's performance, in comparison to hydrogen, is also considerably less. The open circuit potential is only about 65% of its thermodynamic reversible potential. Catalyst loading is necessarily high, with Pt—Ru being proven as the best electrocatalyst. Methanol cannot be used with alkaline electrolytes. DMFC efficiency has been reported at 20–25% only, with significant costs and low performance.

The described invention has several advantages over the DMFC. It is able to take advantage of the higher efficiency of alkaline fuel cells, as compared to acid electrolyte fuel cells. The solubility of ammonia in water is comparable to that of methanol in water. This proposal attempts to substantially improve both anodic and cathodic polarization.

Similarly, the hydroxylamine battery is expected to also exhibit significant advantages over the Nickel Metal Hydride, Alkali Borohydride, Zinc-Air, Lithium-Ion and Lithium Polymer battery systems, due to its high voltage and power density. The hydroxylamine battery has a potential of significantly lower cost than the above batteries, while its reactants could be replenished in less than a minute, compared to the significant recharge time for these battery systems.

The accompanying drawing, which is incorporated in and forms part of the specification, illustrates the embodiments of the present invention, and, together with the description, serves to explain the principles of the invention. In the drawing, FIG. 1 is a cross-sectional schematic of a fuel cell, with metal screen flow fields (18, 20), carbon based electrocatalysts (22, 24), a glass matrix layer (23), backing the metal flow fields, and anode and cathode current collectors (18, 21). In one embodiment of the present invention, the electrolyte is contained in an absorbent glass mat (23). An oxidant solution (13) is supplied to the cathode side, and wets the cathodic flow field. The entire fuel cell is contained between bolted stainless steel plates, with suitable gaskets for leak prevention and electrical isolation.

The present invention comprises a fuel cell novel in both design and method. First, the structure of the fuel cell will be disclosed. Then, the operation of the cell will be discussed, pointing out the various technological hurdles present in prior art and the methodology in circumventing these hurdles.

The following discussion describes in detail one embodiment of the invention and several variations of that embodiment. This discussion should not be construed, however, as limiting the invention to those particular embodiments. Practitioners skilled in the art will recognize numerous other embodiments as well.

The critical feature of this invention, which separates it from the state of prior art, is the use of amine-based fuels, suitably complexed, and an oxidant solution for bulk transport of oxygen and absorption-desorption of oxygen from the solution, rapidly and reversibly, with low polarization losses. In one preferred embodiment, the oxidant solution functions as the supplier of oxygen to the cathode for cathodic electrocatalysis, performs as the electrolyte for ionic conductance between the anode and cathode, and wets the cathode to minimize mass transfer limitations and concentration polarization. Metal screen flow fields and current collectors are used for electrode backing to decrease ohmic losses, as well as to reduce cost and weight of the fuel cell. A matrix insulates the anode and cathode from each other. One preferred embodiment of the matrix is an absorbent glass mat. Another preferred embodiment of the matrix is glass wool. Other matrix materials can be used, provided they exhibit chemical and electrochemical stability. The electrolyte is alkali based, or an anion exchange resin, suitably matrixed or as a solid polymer electrolyte. The function of the matrix is to structurally support the electrodes, separate them for electron insulation, allow ionic conductance, and contain the electrolyte.

Thus, the present invention comprises a fuel cell/battery comprising a matrix configured to facilitate the use of amine as a direct oxidation fuel in an alkaline fuel cell/battery. According to one aspect, the fuel cell/battery comprises an anode electrode; a cathode electrode; a matrix having an anode facing side and a cathode facing side, the matrix being configured to provide ionic conduction and electron insulation; an amine chamber configured to facilitate provision of an amine to the anode electrode and to the matrix; and an oxidant chamber configured to facilitate provision of an oxidant solution to the cathode electrode and to the matrix. The matrix preferably comprises an absorbent material, such as an absorbent glass mat or glass wool. Preferably, an alkaline electrolyte is absorbed within the matrix, or an anionic solid polymer electrolyte is used as the matrix.

Preferably, a carbon electrode catalyst is disposed upon either side of the matrix, intermediate the matrix and a metal screen which defines each electrode of the fuel cell/battery.

Preferably, the matrix is configured to provide structural support for the carbon electrode catalyst, and preferably for the two metal screens, as well. Preferably, the matrix is further configured to provide electrode separation.

An amine-based fuel supply is configured to provide fuel to the anode. An oxidant solution supply is configured to provide oxygen to the cathode.

The cathode electrode is preferably configured so as to be immersed in the oxidant solution.

The anode electrode preferably is configured so as to be immersed in the amine solution.

The amine-based fuel preferably comprises either ammonia, hydroxylamine, hydrazine, a compound of ammonia, hydroxylamine, or hydrazine, or a derivative of ammonia, hydroxylamine, or hydrazine, or a mixture thereof.

The oxidant solution may comprise either an organic oxidizer or an inorganic oxidizer. The oxidant solution preferably comprises permanganate salt. Other oxidizers include chromates and oxyhalides.

According to one aspect, the present invention comprises a housing within which the anode electrode, the cathode electrode, the matrix, the amine chamber and the oxidant chamber are formed and also comprises a cartridge which is removably attachable to the housing. The cartridge is configured to contain at least one, preferably both, of an amine-based fuel and an oxidant solution.

Thus, for example, the fuel cell/battery housing may be physically configured similar to a battery for a cellular telephone. That is, the fuel cell housing may simply be inserted into a cellular telephone in place of the battery thereof. Then a fuel/oxidant cartridge may be inserted into, attached to, or otherwise placed in fluid communication with the fuel cell/battery housing, so as to provide amine-based fuel and an oxidant solution to the fuel cell/battery, as discussed in detail below.

Alternatively, the present invention may be constructed as a battery, such that fuel and oxidant are not replenishable. In this instance, a separate fuel/oxidant cartridge is not necessary.

Alternatively, the fuel cell/battery may be built into or otherwise integrally constructed with a cellular telephone, for example, such that the amine-based fuel and oxidant solution cartridge is simply slid into, attached to, or otherwise placed into fluid communication with the cellular telephone.

As those skilled in the art will appreciate, the fuel cell/battery and the amine-based fuel and oxidant solution cartridge of the present invention may similarly be used with a wide variety of other electricity consuming devices such as laptop computers, palmtop computers, GPS (global positioning system) devices, and any other desired devices.

Referring now to FIG. 1, an exemplary amine-based fuel cell/battery 10 of the present invention is shown schematically. The fuel cell/battery 10 comprises a fuel cell/battery housing 11. An amine fuel port 12 facilitates the introduction of amine-based fuel into the housing 11. An oxygen carrier fluid port 13 facilitates the introduction of an oxidant solution into the housing 11. A fuel port gasket 14 provides a seal which inhibits undesirable leakage of fuel and other chemicals from the housing 11. An oxidant port gasket 16 similarly prevents the undesirable leakage of oxidant and other chemicals from the housing 11.

Figure 4:
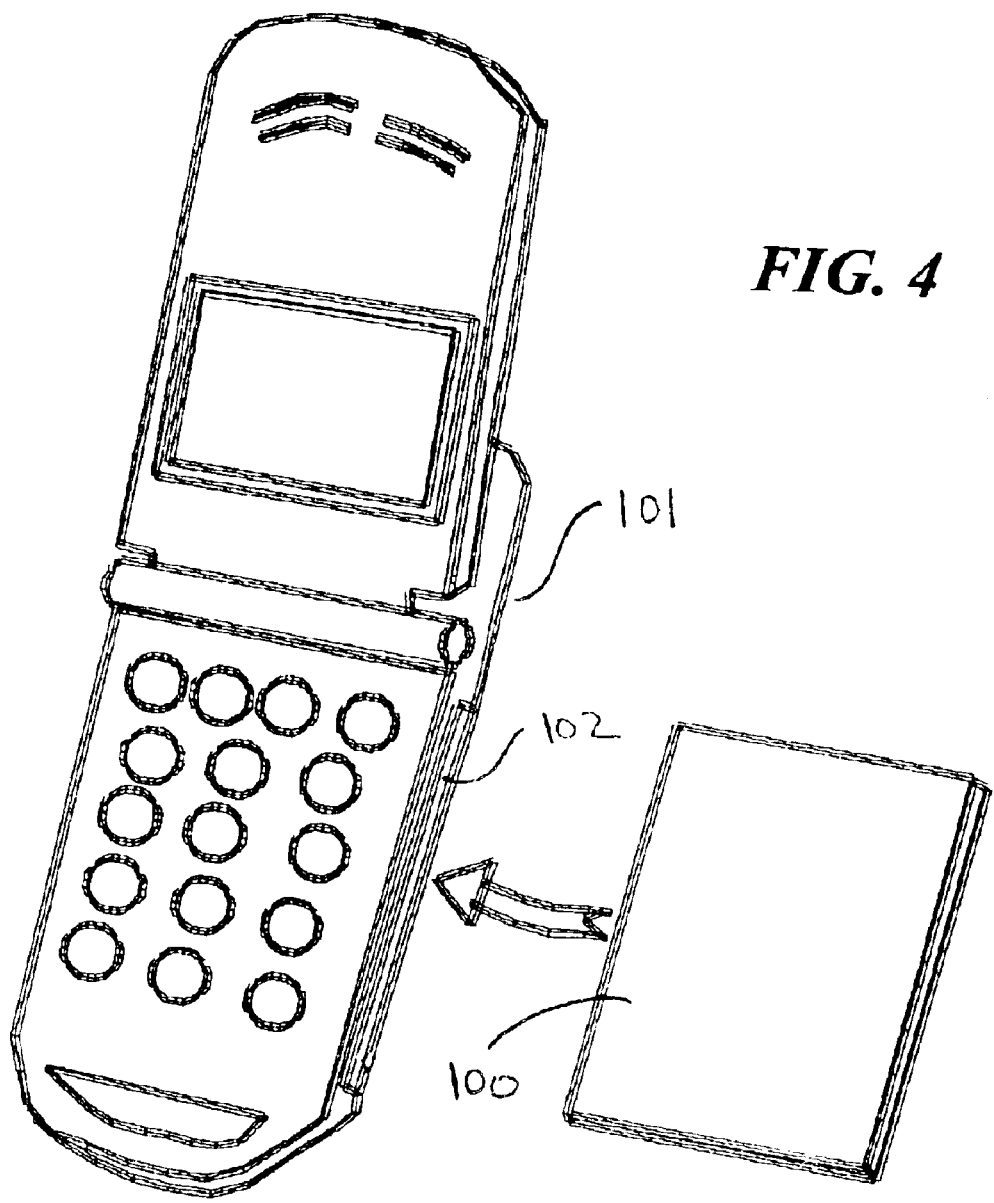
FIG. 4 is a prospective view of an exemplary cellular telephone incorporating an amine-based fuel cell/battery of the present invention and showing a fuel replenishment cartridge positioned for attachment thereto.

According to one aspect of the present invention, amine-based fuel and an oxidant solution are provided to the fuel cell/battery via the amine fuel port 12 and the oxygen carrier fluid port 13 from a replaceable cartridge 100 (FIG. 4). Thus, the fuel port gasket 14 and the oxidant port gasket 16 are necessary to inhibit undesirable leakage of the amine-based fuel and/or the oxidant solution as the amine-based fuel and/or the oxidant solution are communicated from the cartridge 100 to the fuel cell/battery housing 11.

Amine-based fuel is introduced as an amine coordination compound 17 to the fuel cell/battery housing 11, as discussed above.

A perforated metal screen 18 is in electrical communication with the anode 19 of the fuel cell/battery 10 and facilitates field flow and current collection at the anode.

A perforated metal screen 20 is in electrical communication with the cathode 21 and facilitates field flow and current collection at the cathode 21.

A carbon cloth containing electrocatalyst 22 is disposed intermediate the metal screen 18 and an absorbent glass mat (AGM) 23 for facilitating chemical reactions at the anode side, as described above.

A carbon cloth containing electrocatalyst 24 is disposed intermediate the metal screen 20 and the absorbent glass mat 23 to facilitate chemical reactions at the cathode side, as discussed above.

The absorbent glass mat 23 defines a matrix material. The matrix material may comprise glass mat, glass wool, or a similar absorbent material. The absorbent glass mat 23 preferably contains either an alkaline electrolyte or an anionic exchange resin. Preferably, the matrix defined by the absorbent glass mat 23 facilitates structural support for the carbon electrocatalyist 24 and for the metal screens 18 and 20. The matrix defined by the absorbent glass mat 23 further provides electrode separation, ionic conduction and electron insulation. Alternatively the matrix material may comprise a solid polymer electrolyte.

An amine-based fuel chamber 30 is defined within the housing 11 at the anode side thereof and an oxidant solution chamber 31 is formed within the housing 11 at the cathode side thereof.

Figure 2:
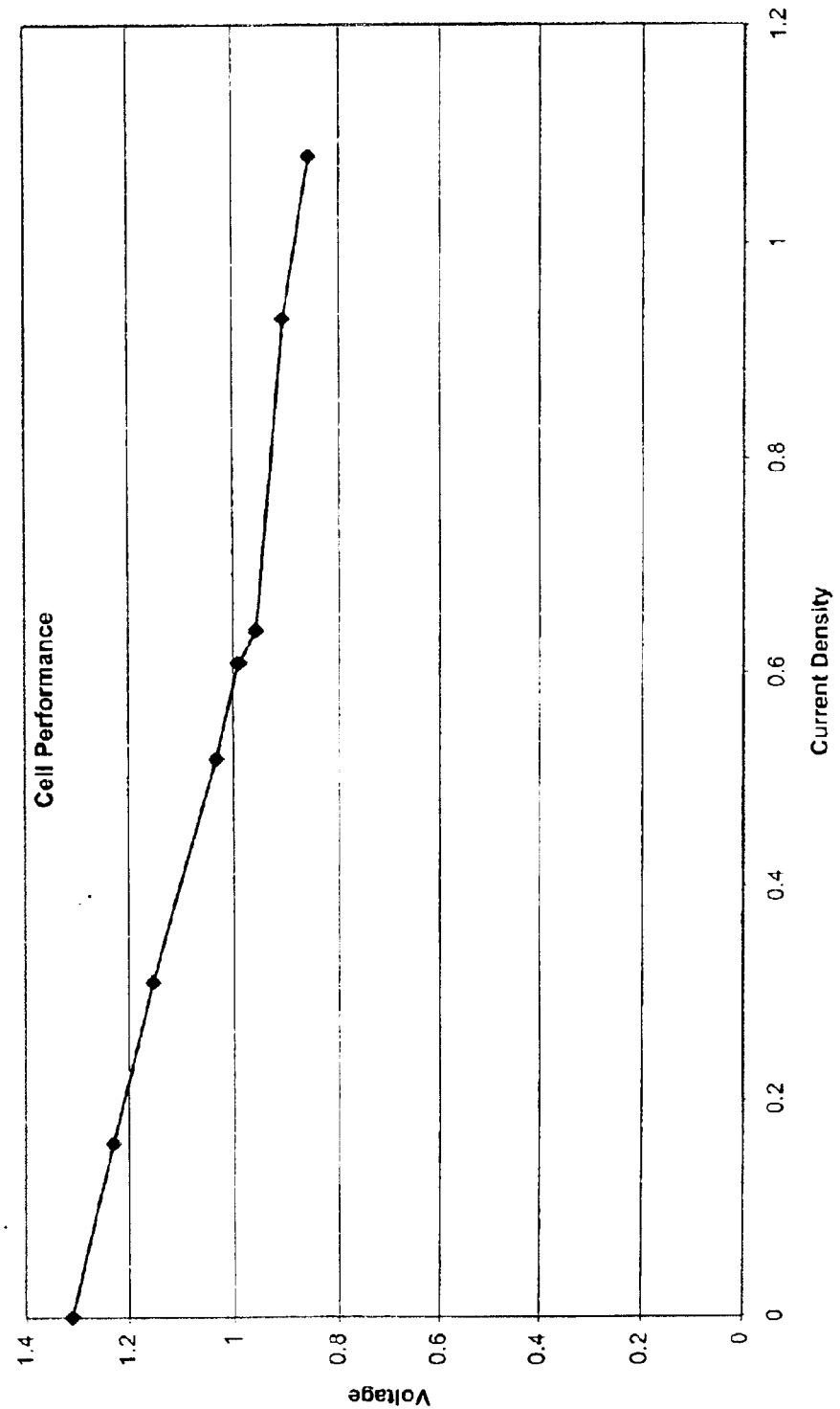
FIG. 2 is a chart providing a performance curve of the amine-based fuel cell/battery of FIG. 1, showing how voltage varies with current density.

Referring now to FIG. 2, a chart showing voltage versus current density for an exemplary ammonia fuel cell/battery of the present invention is provided. It is worth noting that the voltage does not vary substantially over a wide range of current densities.

Referring now to FIG. 3, a tabulation of voltage, current density and power density is provided for an exemplary ammonia fuel cell/battery of the present invention.

Referring now to FIG. 4, the use of a fuel cell/battery in an electric device, such as a cellular telephone 101 is shown. An amine-based fuel and oxidant solution cartridge 100 slides into (such as via slot 102) and attaches to a fuel cell/battery according to the present invention. The fuel cell/battery may either be built into and integrally formed with the cellular telephone 100 or may simply replace the battery thereof. That is, according to one aspect of the present invention, an electric device such as a cellular telephone 101, is manufactured so as to have the fuel cell/battery built thereinto and not easily removable therefrom. According another aspect of the present invention, the fuel cell/battery of the present invention is provided as an after market device which replaces the battery of an electronic device, such as a cellular telephone 101.

In view of the foregoing, the present invention provides a critical, enabling power technology suitable for catering to the global revolution in telecommunications, information systems and the electric power industry, including the defense sector. The present invention provides an energy storage device suitable for use in portable wireless electronics such as laptops, cellular phones, mission-critical instruments, low earth orbital satellites and micro-reconnaissance systems.

The use of aqueous ammonia in the description above is by way of example only and not by way of limitation. Those skilled in the art will appreciate that either aqueous liquid or gaseous ammonia may be utilized. Indeed, either aqueous liquid or gaseous amine coordinate compounds may generally be utilized in the practice of the present invention.

It is understood that the exemplary amine-based fuel cell/battery with high specific energy density described herein and shown in the drawings represents only a presently preferred embodiment of the invention. Indeed, various modifications and additions may be made to such embodiment without departing from the spirit and scope of the invention. Thus, various modifications and additions may be obvious to those skilled in the art and may be implemented to adapt the present invention for use in a variety of different applications.

What is claimed is:

1. A fuel cell/battery comprising: an anode electrode; a cathode electrode;
 a matrix having an anode facing side and a cathode facing side, the matrix being configured to provide ionic conduction and electron insulation;
 an amine chamber configured to facilitate provision of an amine to the anode electrode and to the matrix; and
 an oxidant chamber configured to facilitate provision of an oxidant solution to the cathode electrode and to the matrix.

2. The fuel cell/battery as recited in claim 1, wherein the matrix comprises an absorbent material.

3. The fuel cell/battery as recited in claim 1, wherein the matrix comprises at least one of
 a glass mat; and
 glass wool.

4. The fuel cell/battery as recited in claim 1, further comprising at least one of: an alkaline electrolyte within the matrix; and
 an anionic exchange resin within the matrix.

5. The fuel cell/battery as recited in claim 1 further comprising at least one of: an alkaline electrolyte absorbed within the matrix; and
 an anionic exchange resin contained within the matrix.

6. The fuel cell/battery as recited in claim wherein the matrix comprises an anionic solid polymer membrane electrolyte.

7. The fuel cell/battery as recited in claim 1, further comprising:
 a electrocatalyst dispersed in carbon cloth; and
 wherein the matrix is further configured to provide structural support for the carbon electrocatalyst.

8. The fuel cell/battery as recited in claim 1, wherein the matrix is further configured to provide electrode separation.

9. The fuel cell/battery as recited in claim 1, further comprising: an amine-based fuel supply configured to provide fuel to the anode; and an oxidant solution supply configured to provide oxygen to the cathode.

10. The fuel cell/battery as recited in claim 1, wherein the cathode cloth electrode is configured to be immersed in the oxidant solution.

11. The fuel cell/battery as recited in claim 1, wherein the anode electrode comprises a screen configured to facilitate fuel flow and current collection.

12. The fuel cell/battery as recited in claim 1, wherein the anode electrode comprises a perforated metal screen configured to facilitate fuel flow and current collection.

13. The fuel cell/battery as recited in claim 1, wherein the amine-based fuel comprises a fuel selected from the group consisting of:
 coordinated complexes of amines;
 ammonia;
 an ammonia compound;
 an ammonia derivative;
 a hydroxylamine;
 a hydroxylaniine compound;
 a hydroxylamine derivative;
 hydrazine;
 a hydrazine compound;
 a hydrazine derivative; and
 an amine coordination compound.

14. The fuel cell/battery as recited in claim 1, wherein the oxidant solution comprises an organic oxidizer.

15. The fuel cell/battery as recited in claim 1, wherein the oxidant solution comprises an inorganic oxidizer.

16. The fuel cell/battery as recited in claim 1, wherein the oxidant solution comprises permanganate salt.

17. The fuel cell/battery as recited in claim 1, further comprising:
 a housing within which the anode electrode, the cathode electrode, the matrix, the amine chamber and the oxidant chamber are formed; and
 a cartridge which is removably attachable to the housing, the cartridge being configured to contain at least one of an amine and an oxidant.

18. The fuel cell/battery as recited in claim 1, further comprising:
 a housing within which the anode electrode, the cathode electrode, the matrix, the amine chamber and the oxidant chamber are formed; and
 a cartridge which is removably attachable to the housing, the cartridge being configured to contain an amine and an oxidant.

19. A cartridge for a fuel cell/battery, the cartridge comprising:
 a cartridge housing which is configured to be removably attachable to a fuel cell/batter housing, the cartridge housing being configured to contain at least one of an amine and an oxidant.

20. The cartridge as recited in claim 19, where the cartridge housing is configured to contain an amine and an oxidant.

21. A combination electricity consuming device and fuel cell/battery comprising:
 an electricity consuming device;
 a fuel cell/battery electrically coupled to the electricity consuming device for providing power thereto, the fuel cell/battery comprising:
 an anode electrode;
 a cathode electrode;
 a matrix having an anode facing side and a cathode facing side, the matrix being configured to provide ionic conduction and electron insulation;
 an amine chamber configured to facilitate provision of an amine to the anode electrode and to the matrix; and
 an oxidant chamber configured to facilitate provision of an oxidant solution to the cathode electrode and to the matrix.

22. The combination as recited in claim 21, wherein the fuel cell/battery is formed integrally with respect to the electricity consuming device.

23. The combination as recited in claim 21, wherein the fuel cell/battery is formed separately with respect to the electricity consuming device.

24. The combination as recited in claim 21, wherein the fuel cell/battery is removable from the electricity consuming device.

25. The combination as recited in claim 21, wherein the fuel cell/battery is configured to replace a battery of the electricity consuming device or recharge the battery of the electricity consuming device.

26. The combination as recited in claim 21, wherein the fuel cell/battery comprises a removably attachable cartridge, the cartridge being configured to contain at least one of an amine-based fuel and an oxidant solution.

27. A cellular telephone comprising:
a receiver;
a transmitter;
a fuel cell/battery electrically coupled to the receiver and the transmitter for providing power thereto, the fuel cell/battery comprising:
an anode electrode;
a cathode electrode;
a matrix having an anode facing side and a cathode facing side, the matrix being configured to provide ionic conduction and electron insulation;
an amine chamber configured to facilitate provision of an amine to the anode electrode and to the matrix; and
an oxidant chamber configured to facilitate provision of an oxidant solution to the cathode electrode and to the matrix.

28. The cellular telephone as recited in claim 27, wherein the fuel cell/battery is formed integrally with respect to the receiver and transmitter.

29. The cellular telephone as recited in claim 27, wherein the fuel cell/battery is formed separately with respect to the receiver and transmitter.

30. The cellular telephone as recited in claim 27, wherein the fuel cell/battery is removable from the receiver and transmitter.

31. The celluar telephone as recited in claim 27, wherein the fuel cell/battery is configured to replace or recharge a battery of the electricity receiver and transmitter.

32. The cellular telephone as recited in claim 27, wherein the fuel cell/battery comprises a removably attachable cartridge, the cartridge being configured to contain at least one of an amine-based fuel and an oxidant solution.

33. An electrochemical method for providing electricity, the method comprising: providing an anode electrode;
providing a cathode electrode;
providing ionic conduction and electron insulation via a matrix having an anode facing side and a cathode facing side;
providing an amine to the anode electrode and to the matrix via an amine chamber; and
provision of an oxidant solution to the cathode electrode and to the matix via an oxidant chamber.

34. The method as recited in claim 33, wherein the matrix comprises an absorbent material.

35. The method as recite in claim 33, wherein the matrix comprises at least one at least one of:
a glass mat; and
glass wool.

36. The method as recited in claim 33, further comprising at least one of: an alkaline electrolyte within the matrix; and
an anionic exchange resin within the matrix.

37. The method as recited in claim 33, further comprising at least one of: an alkaline electrolyte absorbed within the matrix; and an anionic solid polymer electrolyte absorbed within the matrix.

38. The method as recited in claim 33, wherein the matrix comprises an anionic solid polymer membrane.

39. The method as recited in claim 33, further comprising:
a carbon cloth impregnated with electrocatalyst; and
wherein the matrix is further configured to provide structural support for the carbon electrocatalyst.

40. The method as recited in claim 33, further comprising providing electrode separation via the matrix.

41. The method as recited in claim 33, further comprising:
providing amine-based fuel to the anode;
and providing an oxidant solution to the cathode.

42. The method as recited in claim 33, further comprising immersing the cathode electrode in the oxidant solution.

43. The method as recited in claim 33, further comprising facilitating field flow and current collection via an anode electrode comprising a screen.

44. The method as recited in claim 33, further comprising facilitating field flow and current collection via an anode electrode comprising a perforated metal screen.

45. The method as recited in claim 33, wherein the amine-based fuel comprises a fuel selected from the group consisting of:
coordinated complexes of amines;
ammonia;
an ammonia compound;
an ammonia derivative;
a hydroxylamine;
a hydroxylamine compound;
a hydroxylamine derivative;
hydrazine;
a hydrazine compound;
a hydrazine derivative; and
an amine coordination compound.

46. The method as recited in claim 33, wherein the oxidant solution comprises an organic oxidizer.

47. The method as recited in claim 33, wherein the oxidant solution comprises an inorganic oxidizer salt.

48. The method as recited in claim 33, wherein the oxidant solution comprises permanganate.

49. A method for replenishing a fuel cell/battery, the method comprising:
removing a substantially spent first cartridge from a fuel cell/battery, the fuel cell/battery comprising:
an anode electrode;
a cathode electrode;
a matrix having an anode facing side and a cathode facing side, the matrix being configured to provide ionic conduction and electron insulation;
an amine chamber configured to facilitate provision of an amine to the anode electrode and to the matrix;
an oxidant chamber configured to facilitate provision of an oxidant solution to the cathode electrode and to the matrix; and
attaching a second cartridge to the fuel cell/battery, the second cartridge containing at least one of an amine-based fuel and an oxidant solution.

50. A method for powering an electricity consuming device, the method comprising:
providing an electricity consuming device;
powering the electricity consuming device via a fuel cell/battery electrically coupled thereto, the fuel cell/battery comprising:
an anode electrode;
a cathode electrode;
a matrix having an anode facing side and a cathode facing side, the matrix being configured to provide ionic conduction and electron insulation;
an amine chamber configured to facilitate provision of an amine to the anode electrode and to the matrix; and
an oxidant chamber configured to facilitate provision of an oxidant solution to the cathode electrode and to the matrix.

51. The method as recited in claim 50, wherein the fuel cell/battery is formed integrally with respect to the electricity consuming device.

52. The method as recited in claim 50, wherein the fuel cell/battery is formed separately with respect to the electricity consuming device.

53. The method as recited in claim 50, wherein the fuel cell/battery is removable from the electricity consuming device.

54. The method as recite in claim 50, wherein the fuel cell/battery is configured to replace a battery of the electricity consuming device.

55. The method as recited in claim 50, wherein the fuel cell/battery comprises a removably attachable cartridge, the cartridge being configured to contain at least one of an amine-based fuel and an oxidant solution.

56. A method for powering a cellular telephone, the method comprising: providing a receiver;

providing a transmitter;

powering the receiver and the transmitter via a fuel cell/battery electrically coupled to the receiver and the transmitter, the fuel cell battery comprising:

an anode electrode;

a cathode electrode;

a matrix having an anode facing side and a cathode facing side, the matrix being configured to provide ionic conduction and electron insulation;

an amine chamber configured to facilitate provision of an amine to the anode electrode and to the matrix; and an oxidant chamber configured to facilitate provision of an oxidant solution to the cathode electrode and to the matrix.

57. The method as recited in claim 56, wherein the fuel cell/battery is formed integrally with respect to the receiver and transmitter.

58. The method as recited in claim 56, wherein the fuel cell/battery is formed separately with respect to the receiver and transmitter.

59. The method as recited in claim 56, wherein the fuel cell/battery is removable from the receiver and transmitter.

60. The method as recited in claim 56, wherein the fuel cell/battery is configured to replace a battery of the electricity receiver and transmitter.

61. The method as recited in claim 56, wherein the fuel cell/battery comprises a removably attachable cartridge, the cartridge being configured to contain at least one of an amine-based fuel and an oxidant solution.

* * * * *